United States Patent
Ozer et al.

(10) Patent No.: US 12,093,121 B2
(45) Date of Patent: Sep. 17, 2024

(54) POST-MANUFACTURING ADAPTATION OF A DATA PROCESSING APPARATUS

(71) Applicant: Arm Limited, Cambridge (GB)

(72) Inventors: Emre Ozer, Buckden (GB); Mbou Eyole, Soham (GB); Jedrzej Kufel, Soham (GB); John Philip Biggs, Cambridge (GB)

(73) Assignee: Arm Limited, Cambridge (GB)

( * ) Notice: Subject to any disclaimer, the term of this patent is extended or adjusted under 35 U.S.C. 154(b) by 300 days.

(21) Appl. No.: 17/547,963

(22) Filed: Dec. 10, 2021

(65) Prior Publication Data
US 2023/0185651 A1    Jun. 15, 2023

(51) Int. Cl.
G06F 11/07 (2006.01)
G06F 13/24 (2006.01)
G06F 30/20 (2020.01)

(52) U.S. Cl.
CPC .......... *G06F 11/0787* (2013.01); *G06F 13/24* (2013.01); *G06F 30/20* (2020.01)

(58) Field of Classification Search
CPC ....... G06F 11/0787; G06F 30/20; G06F 13/24
See application file for complete search history.

(56) References Cited

U.S. PATENT DOCUMENTS

| | | | | |
|---|---|---|---|---|
| 5,862,370 A * | 1/1999 | Dockser | ............. | G06F 9/30145 712/226 |
| 6,006,030 A * | 12/1999 | Dockser | ............. | G06F 9/30145 712/E9.06 |
| 6,553,513 B1 * | 4/2003 | Swoboda | ............. | G06F 11/3656 714/28 |
| 6,754,852 B2 * | 6/2004 | Swoboda | ............. | G06F 11/3656 714/39 |
| 6,990,569 B2 * | 1/2006 | Hill | ....................... | G06F 9/3861 712/E9.06 |

(Continued)

OTHER PUBLICATIONS

Combined Search and Examination Report for GB Application No. 2217491.6 dated May 24, 2023, 6 pages.

(Continued)

*Primary Examiner* — Nimesh G Patel
(74) *Attorney, Agent, or Firm* — NIXON & VANDERHYE P.C.

(57) ABSTRACT

Methods of performing post-manufacturing adaptation of a data processing apparatus manufactured in accordance with a processor design and corresponding data processing apparatus configurations are provided. Post-manufacturing testing of the data processing apparatus determines any dysfunctional instructions by comparison between component usage profiles for each instruction and a component fault-detection procedure applied to the data processing apparatus. The data processing apparatus can be determined nevertheless to be operationally viable when any dysfunctional instructions can be substituted for by emulation using other functional instructions. The data processing apparatus can be provided with dysfunctional instruction handling circuitry configured to identify occurrence of a program instruction instance of a dysfunctional instruction and to invoke an interrupt handling routine associated with the dysfunctional instruction to emulate the instance of a dysfunctional instruction.

21 Claims, 6 Drawing Sheets

(56) References Cited

U.S. PATENT DOCUMENTS

| | | | |
|---|---|---|---|
| 2002/0184477 A1* | 12/2002 | Swaine | G06F 11/3636 712/E9.046 |
| 2003/0084272 A1 | 5/2003 | Hill | |
| 2023/0093493 A1* | 3/2023 | Poornachandran | G06F 11/0793 714/48 |

OTHER PUBLICATIONS

Examination Report for GB Application No. 2217491.6 dated Mar. 1, 2024, 4 pages.

* cited by examiner

POST-MANUFACTURING ADAPTATION OF A DATA PROCESSING APPARATUS

TECHNICAL FIELD

The present disclosure relates to data processing. In particular, the present disclosure relates to the manufacturing of a data processing apparatus and its subsequent use.

DESCRIPTION

A data processing apparatus can be manufactured in accordance with a processor design. Generally, such manufacturing can be very reliable in that the yield (proportion of correctly manufactured, functional products) can be high. Nevertheless, certain manufacturing processes may have lower yields, resulting in a greater proportion of manufactured data processing apparatuses which are then discarded because they do not pass functional testing post-manufacture.

SUMMARY

In one example described herein there is a method of performing post-manufacturing adaptation of a data processing apparatus manufactured in accordance with a processor design, wherein the processor design corresponds to an instruction set architecture, comprising:
  generating a component usage profile of a processor simulation in accordance with the processor design for each instruction of the instruction set architecture;
  performing a fault-detection procedure on the data processing apparatus to determine one or more component faults;
  determining one or more dysfunctional instructions of the instruction set architecture as applied to the data processing apparatus by mapping the one or more component faults determined onto the component usage profile;
  determining whether the data processing apparatus is operationally viable in that the one or more dysfunctional instructions can be substituted for by usage of one or more instructions which are not found to be dysfunctional instructions for the data processing apparatus;
  signalling that the data processing apparatus requires modified operation when it is determined to be operationally viable; and
  signalling that the data processing apparatus is to be discarded when it is determined not to be operationally viable.

In one example described herein there is a data processing apparatus, wherein the data processing apparatus has been manufactured in accordance with a processor design corresponding to an instruction set architecture, and wherein one or more dysfunctional instructions of the instruction set architecture as applied to the data processing apparatus have been identified, the data processing apparatus comprising:
  instruction execution circuitry to perform data processing operations by execution of a sequence of program instructions;
  dysfunctional instruction handling circuitry configured to identify occurrence of a program instruction instance of a dysfunctional instruction of the one or more dysfunctional instructions in the sequence of program instructions and to invoke an interrupt handling routine associated with the dysfunctional instruction, wherein the interrupt handling routine substitutes for execution of the instance of a dysfunctional instruction.

In one example described herein there is a data processing system comprising:
  a first data processing apparatus;
  a second data processing apparatus,
  wherein a first set of one or more dysfunctional instructions of the first data processing apparatus and a second set of one or more dysfunctional instructions of the second data processing apparatus do not intersect; and
  communication circuitry configured to support communication between the first data processing apparatus and the second data processing apparatus,
  wherein the first data processing apparatus and the second data processing are configured to operate in lock-step with each other to perform data processing operations by execution of a sequence of program instructions,
  and wherein the first data processing apparatus is responsive to identifying occurrence of a program instruction instance of a dysfunctional instruction of the first set of one or more dysfunctional instructions in the sequence of program instructions to:
  pause the execution of the sequence of program instructions in the first data processing apparatus; and
  communicate via the communication circuitry to the second data processing apparatus an indication of the program instruction instance of the dysfunctional instruction,
  wherein the second data processing apparatus is responsive to the indication of the program instruction instance of the dysfunctional instruction to return via the communication circuitry results of execution of the program instruction instance of the dysfunctional instruction,
  and wherein the first data processing apparatus is responsive to reception of the results of execution to resume the execution of the sequence of program instructions in the first data processing apparatus after the program instruction instance of the dysfunctional instruction.

In one example described herein there is a data processing system comprising:
  a first data processing apparatus;
  a second data processing apparatus,
  wherein a first set of one or more dysfunctional instructions of the first data processing apparatus and a second set of zero or more dysfunctional instructions of the second data processing apparatus do not intersect; and
  communication circuitry configured to support communication between the first data processing apparatus and the second data processing apparatus,
  wherein the first data processing apparatus is responsive to identifying occurrence of a program instruction instance of a dysfunctional instruction of the first set of one or more dysfunctional instructions in the sequence of program instructions to:
  pause the execution of the sequence of program instructions in the first data processing apparatus; and
  communicate via the communication circuitry to the second data processing apparatus an indication of the program instruction instance of the dysfunctional instruction and any operands associated with the program instruction instance,
  wherein the second data processing apparatus is responsive to the program instruction instance of the dysfunctional instruction to return via the communication circuitry results of execution of the program instruction instance of the dysfunctional instruction, and wherein the first data processing apparatus is responsive to reception of the results of execution to resume the execution of the sequence of program instructions in the first data processing apparatus after the program instruction instance of the dysfunctional instruction.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Figure 1A:
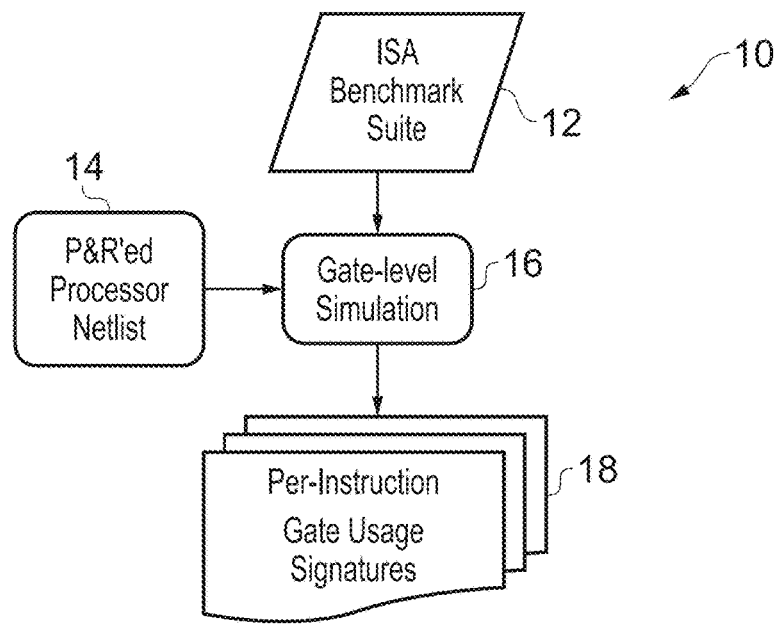
FIG. 1A illustrates a process by which a component usage profile of a processor simulation is generated in accordance with some examples.

Before discussing the embodiments with reference to the accompanying figures, the following description of embodiments is provided.

In accordance with one example configuration there is provided a method of performing post-manufacturing adaptation of a data processing apparatus manufactured in accordance with a processor design, wherein the processor design corresponds to an instruction set architecture, comprising:
  generating a component usage profile of a processor simulation in accordance with the processor design for each instruction of the instruction set architecture;
  performing a fault-detection procedure on the data processing apparatus to determine one or more component faults;
  determining one or more dysfunctional instructions of the instruction set architecture as applied to the data processing apparatus by mapping the one or more component faults determined onto the component usage profile;
  determining whether the data processing apparatus is operationally viable in that the one or more dysfunctional instructions can be substituted for by usage of one or more instructions which are not found to be dysfunctional instructions for the data processing apparatus;
  signalling that the data processing apparatus requires modified operation when it is determined to be operationally viable; and
  signalling that the data processing apparatus is to be discarded when it is determined not to be operationally viable.

When a data processing apparatus is manufactured in accordance with a processor design the yield of that manufacturing process (i.e. the success rate for producing a correctly functioning data processing apparatus) may be sufficiently high that any data processing apparatus which is found not to function correctly in post-manufacturing testing is simply discarded. However, the yield of such manufacturing processes can vary, for example the manufacture of printed and flexible integrated circuits is becoming more common, and the yield of the manufacture of such devices can be relatively low, in that a significant number of them do not pass full functional correctness testing. Nevertheless, it is not uncommon for such a manufactured device to function partially correctly. For example, it may the case that only a small subset of the components (e.g. gates) from which a processor is constructed do not function, whilst a majority of them exhibit full functional correctness. In this context the inventors realized that a processor in which only a relatively small subset of its components (e.g. gates) do not function correctly may nevertheless be successfully used. In particular, this insight is firstly based on the recognition that knowledge of the set of components (e.g. gates) which do not function correctly can be mapped onto the instruction set architecture of the processor to give a corresponding set of "dysfunctional instructions" for the processor, i.e. instructions which form part of the instruction set architecture, which the processor cannot correctly execute. The insight is secondly based on the recognition that many instructions can be substituted for by a combination of other instructions which form part of the instruction set architecture. More generally it is known that certain instructions, such as SUBLEQ ("SUBtract and branch if Less-than or EQual to zero") and SUBNEG ("SUBtract and branch if NEGative"), are Turing complete instructions that each can be used to implement all other arithmetic instructions. Accordingly, even when one or more instructions of a manufactured processor are found to be dysfunctional, it may well be the case that the one or more dysfunctional instructions can be emulated through the use of other instructions (which themselves cannot be dysfunctional). In this way, a manufactured data processing apparatus, which is found in post-manufacturing testing not to exhibit full functional correctness, may nonetheless be rescued and successfully used, by providing mechanisms to support such emulation of its one or more dysfunctional instructions.

In this context, one aspect of the present techniques relates to a method carried out following the manufacture of a data processing apparatus in order to establish whether it exhibits any functional faults and how those functional faults translate into dysfunctional instructions. This is done by profiling a simulation of the processor in accordance with the processor design to determine which components are used for each instruction of the instruction set architecture. This information can then be combined with the result of a fault detection procedure (e.g. scan chain testing) carried out on the manufactured data processing apparatus in order to determine, on the basis of any components which are found not to function correctly, the dysfunctional instructions for this data processing apparatus. The components for these techniques may be individual gates or a coarser granularity of component may be used. Moreover, depending on which instructions of the instruction set architecture are found to be dysfunctional, a determination can then be made as to whether the data processing apparatus is operationally viable in that its dysfunctional instructions can be substituted for by use of other instructions (which themselves are not found to be dysfunctional instructions). The data processing apparatus can then be categorised a) as functioning fully correctly, b) as having one or more dysfunctional instructions but nonetheless to be operationally viable (subject to modified operation), or c) as not being operationally viable, i.e. its dysfunctional instructions are such that no workaround is possible.

In the event that a manufactured data processing apparatus is determined to be operationally viable subject to modified operation, this modified operation may be supported in a number of ways. However, in some examples the method further comprises, when the data processing apparatus requires modified operation, generating one or more interrupt handling routines corresponding to the one or more dysfunctional instructions, wherein the one or more interrupt handling routines comprise substitutions for the one or more dysfunctional instructions using the one or more instructions which are not found to be dysfunctional instructions for the data processing apparatus; and storing the one or more interrupt handling routines in association with the data processing apparatus.

Accordingly, the one or more interrupt handling routines provide emulation of the one or more dysfunctional instructions, and these interrupt handling routines can then be provided in association with the data processing apparatus, such that (by means of one of various possible mechanisms to be described in more detail below), in the event that one of the dysfunctional instructions is encountered during instruction execution by the data processing apparatus, the corresponding interrupt handling routine can be invoked to provide the necessary instruction emulation.

It is further recognised that as part of the modified operation of the data processing apparatus any dysfunctional instruction which occurs in the sequence of instructions executed by the data processing apparatus needs to be identified. This may be achieved in various ways however in some examples the method further comprises, when the data processing apparatus requires modified operation, causing post-manufacturing programmable storage in the data processing apparatus to store one or more indications corresponding to the one or more dysfunctional instructions.

Thus the storage forming part of the data processing apparatus (and the content of which can be modified post-manufacturing) can form a reference structure which holds the information for the data processing apparatus indicating which instructions are dysfunctional. Such storage may be configured in a variety of ways, but may for example allow a lookup on the basis of a unique identifier of each instruction (e.g. related to its opcode) to then respond with an indication of whether that instruction is dysfunctional not.

The storage may be provided in a variety of ways, but in some examples the post-manufacturing programmable storage is a laser-programmable read-only-memory. This may for example allow single bits of the storage to be modified, to then form a read-only set of bits in the data processing apparatus, where one bit corresponds to each instruction in the instruction set architecture and can thus indicate on a per instruction basis which instructions are dysfunctional.

In some examples the method further comprises causing a post-manufacturing programmable register to store a value indicative of a storage location of the interrupt handling routine. Accordingly, this provides the flexibility to define where a particular interrupt handling routine, which emulates the execution of the dysfunctional instruction, is to be found and hence when the data processing apparatus encounters such a dysfunctional instruction it can determine where to find the required interrupt handling routine with reference to this post-manufacturing programmable register. As in the case of the read-only memory described above, this programmable register may be provided as a laser programmable post-manufacturing programmable register.

Rather than storing an indication of the location of the interrupt service routine, in some examples this information may be in the form of a particular interrupt identifier (i.e. IRQ #) which is to be used when the dysfunctional instruction is encountered to invoke the required interrupt handling routine. Hence in some examples the value indicative of the storage location of the interrupt handling routine is a unique interrupt identifier.

When a data processing apparatus has been identified as having one or more dysfunctional instruction, but nonetheless to still be operationally viable, the modified operation of the data processing apparatus may be provided in a variety of ways. Whilst some of these ways comprise further adaptation of the data processing apparatus itself in order to cope with the presence of the one or more dysfunctional instructions, the present techniques also propose that modification of a sequence of program instructions intended for execution by the data processing apparatus may provide the necessary adaptation. Accordingly, in some examples of the method further comprises:

providing a compiler with an indication of the one or more dysfunctional instructions;
providing the compiler with a sequence of program instructions intended for execution by the data processing apparatus to perform data processing operations;
operating the compiler to identify occurrence of a program instruction instance of a dysfunctional instruction of the one or more dysfunctional instructions in the sequence of program instructions; and operating the compiler to generate modified executable code for the data processing apparatus by substituting for the program instruction instance of the dysfunctional instruction using the one or more instructions which are not found to be dysfunctional instructions for the data processing apparatus.

In accordance with one example configuration there is provided a data processing apparatus, wherein the data processing apparatus has been manufactured in accordance with a processor design corresponding to an instruction set architecture, and wherein one or more dysfunctional instructions of the instruction set architecture as applied to the data processing apparatus have been identified, the data processing apparatus comprising:

instruction execution circuitry to perform data processing operations by execution of a sequence of program instructions;

dysfunctional instruction handling circuitry configured to identify occurrence of a program instruction instance of a dysfunctional instruction of the one or more dysfunctional instructions in the sequence of program instructions and to invoke an interrupt handling routine associated with the dysfunctional instruction, wherein the interrupt handling routine substitutes for execution of the instance of a dysfunctional instruction.

Accordingly, once manufactured a data processing apparatus that has been identified to have one or more dysfunctional instructions can nevertheless operate functionally correctly by means of its dysfunctional instruction handling circuitry which identifies such dysfunctional instructions when they occur in the sequence of instructions being executed and invokes a corresponding interrupt handling routine which provides the necessary emulation for a dysfunctional instruction, such that the data processing apparatus can operate functionally correctly.

In some examples the data processing apparatus further comprises interrupt handling circuitry configured to perform the interrupt handling routine in response to a signal from the dysfunctional instruction handling circuitry.

The data processing apparatus may be arranged to identify the one or more dysfunctional instructions in a variety of ways, but in some examples the data processing apparatus further comprises:

post-manufacturing programmable storage storing one or more indications corresponding to the one or more dysfunctional instructions, wherein the dysfunctional instruction handling circuitry is configured to identify the occurrence of the program instruction instance of the dysfunctional instruction with reference to indications stored in the post-manufacturing programmable storage.

Accordingly, when the post-manufacturing functional testing of the data processing apparatus has been carried out and as a result one or more dysfunctional instructions have been identified, the one or more dysfunctional instructions can be permanently identified in the post-manufacturing programmable storage, such that it then provides a permanent reference for the data processing apparatus to identify those instructions which it cannot correctly execute.

The post-manufacturing programmable storage may take a variety of forms but in some examples the post-manufacturing programmable storage is a laser-programmable read-only-memory. This may for example allow single bits of the storage to be modified, to then form a read-only set of bits in the data processing apparatus, where one bit corresponds to each instruction in the instruction set architecture and can thus indicate on a per instruction basis which instructions are dysfunctional.

In some examples the data processing apparatus further comprises a post-manufacturing programmable register storing a value indicative of a storage location of the interrupt handling routine. Accordingly, this provides the flexibility to define where a particular interrupt handling routine, which emulates the execution of the dysfunctional instruction, is to be found and hence when the data processing apparatus encounters such a dysfunctional instruction it can determine where to find the required interrupt handling routine with reference to this post-manufacturing programmable register. As in the case of the read-only memory described above, this programmable register may be provided as a laser programmable post-manufacturing programmable register.

Rather than storing an indication of the location of the interrupt service routine, in some examples this information may be in the form of a particular interrupt identifier (i.e. IRQ #) which is to be used when the dysfunctional instruction is encountered to invoke the required interrupt handling routine. Hence in some examples the value indicative of the storage location of the interrupt handling routine is a unique interrupt identifier, wherein the dysfunctional instruction handling circuitry is configured to signal the occurrence to the interrupt handling circuitry using the unique interrupt identifier.

Whilst the one or more interrupt handling routines which provide emulation of the one or more dysfunctional instructions may be provided locally, i.e. stored within the data processing apparatus ab initio, in some examples the interrupt handling routine may be stored in and provided by a further data processing apparatus with which the data processing apparatus can communicate. Accordingly, in some examples the data processing apparatus further comprises:

a communication interface configured to provide communication with a further data processing apparatus; and local storage, wherein the dysfunctional instruction handling circuitry is configured to invoking the interrupt handling routine associated with the dysfunctional instruction by causing the data processing apparatus to:

pause the execution of the sequence of program instructions;

transmit via the communication interface to the further data processing apparatus an indication of the program instruction instance of the dysfunctional instruction;

receive via the communication interface the interrupt handling routine from the further data processing apparatus and storing the interrupt handling routine in the local storage;

execute the interrupt handling routine from the local storage; and resume the execution of the sequence of program instructions after the program instruction instance of the dysfunctional instruction.

This arrangement avoids the need for the data processing apparatus to be provided with one or more associated interrupt handlers. Moreover, one context in which the present techniques are proposed is that of printed/flexible electronics, in which case the data processing apparatus may be expected to be a relatively simple, low-power device, for example as may be provided as the processor for "smart packaging" or disposable wearables. Such devices may in any event only operate intermittently, for example in the case of a smart label attached to an item in a warehouse, the processor of the smart label might only be operational at particular moments when the item is handled in the warehouse environment, e.g. when checking it in, when stock-taking, or when checking it out. Further, such operation of the smart label may for example be initiated when a further data processing apparatus (such as a device which reads the smart label and possibly exchanges information with it). As such, when the data processing apparatus is in communication with a further data processing apparatus, the data storage and data processing capabilities of the further data processing apparatus may therefore be made use of, such as to provide the required interrupt handling routine.

Indeed, the further data processing apparatus may be leaned on in order not only to provide information as in the above example, but in other examples the further data processing apparatus may be requested to perform certain data processing operations on behalf the data processing apparatus, such as may emulate the execution of a dysfunctional instruction. Accordingly, in some examples the data processing apparatus further comprises:

a communication interface configured to provide communication with a further data processing apparatus,
wherein the dysfunctional instruction handling circuitry is configured to invoking the interrupt handling routine associated with the dysfunctional instruction by causing the data processing apparatus to:
pause the execution of the sequence of program instructions;
transmit via the communication interface to the further data processing apparatus an indication of the program instruction instance of a dysfunctional instruction;
receive via the communication interface from the further data processing apparatus results of execution of the program instruction instance of the dysfunctional instruction; and
resume the execution of the sequence of program instructions after the program instruction instance of the dysfunctional instruction.

The communication between the data processing apparatus and at the further data processing apparatus may be provided in a variety of ways, but in some examples the communication interface supports wireless communication.

In some examples the communication interface is an RFID interface.

In accordance with one example configuration there is provided a data processing system comprising:
a first data processing apparatus;
a second data processing apparatus,
wherein a first set of one or more dysfunctional instructions of the first data processing apparatus and a second set of one or more dysfunctional instructions of the second data processing apparatus do not intersect; and
communication circuitry configured to support communication between the first data processing apparatus and the second data processing apparatus,
wherein the first data processing apparatus and the second data processing are configured to operate in lock-step with each other to perform data processing operations by execution of a sequence of program instructions,
and wherein the first data processing apparatus is responsive to identifying occurrence of a program instruction instance of a dysfunctional instruction of the first set of one or more dysfunctional instructions in the sequence of program instructions to:
pause the execution of the sequence of program instructions in the first data processing apparatus; and
communicate via the communication circuitry to the second data processing apparatus an indication of the program instruction instance of the dysfunctional instruction,
wherein the second data processing apparatus is responsive to the indication of the program instruction instance of the dysfunctional instruction to return via the communication circuitry results of execution of the program instruction instance of the dysfunctional instruction,
and wherein the first data processing apparatus is responsive to reception of the results of execution to resume the execution of the sequence of program instructions in the first data processing apparatus after the program instruction instance of the dysfunctional instruction.

Accordingly, a data processing system is proposed which combines two data processing apparatus in a manner which allows each to compensate for the one or more dysfunctional instructions of the other.

In such a system it may be arranged that only one of the first data processing and the second data processing apparatus is permitted to perform updates with respect to a memory to which both the first data processing apparatus and the second data processing apparatus have access.

In accordance with one example configuration there is provided a data processing system comprising:
a first data processing apparatus
a second data processing apparatus,
wherein a first set of one or more dysfunctional instructions of the first data processing apparatus and a second set of zero or more dysfunctional instructions of the second data processing apparatus do not intersect; and
communication circuitry configured to support communication between the first data processing apparatus and the second data processing apparatus,
wherein the first data processing apparatus is responsive to identifying occurrence of a program instruction instance of a dysfunctional instruction of the first set of one or more dysfunctional instructions in the sequence of program instructions to:
pause the execution of the sequence of program instructions in the first data processing apparatus; and
communicate via the communication circuitry to the second data processing apparatus an indication of the program instruction instance of the dysfunctional instruction and any operands associated with the program instruction instance,
wherein the second data processing apparatus is responsive to the program instruction instance of the dysfunctional instruction to return via the communication circuitry results of execution of the program instruction instance of the dysfunctional instruction,
and wherein the first data processing apparatus is responsive to reception of the results of execution to resume the execution of the sequence of program instructions in the first data processing apparatus after the program instruction instance of the dysfunctional instruction.

Accordingly, a data processing system is proposed which combines two data processing apparatus, one of which has one or more dysfunctional instructions, and where the other is invoked to perform delegated processing in order to allow the one or more dysfunctional instructions to be executed without error.

Particular embodiments will now be described with reference to the figures.

FIG. 1A illustrates a process 10 by which a component usage profile of a processor simulation is generated in accordance with some examples. In the illustrated example this profiling is carried out at a gate-level granularity of the processor components, but coarser granularity profiling and testing could instead be carried out. An ISA (instruction set architecture) benchmark suite (i.e. providing full coverage of the instructions defined for the ISA) 12 and a placed-and-routed processor netlist 14 together support a gate-level simulation 16 of a processor design in accordance with the ISA. Otherwise put, this enables the processor design (in this example down to individual gate level) to be fully tested by all instructions which are defined for the ISA. The result is a set of per-instruction component (gate) usage signatures 18, which provide an indication of all gates of the processor design which are active when a given instruction is executed.

Figure 1B:
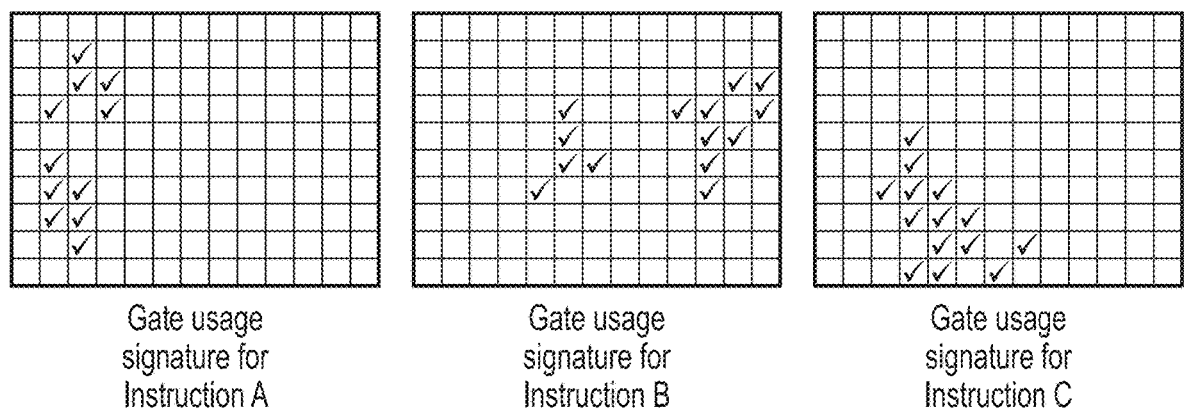
FIG. 1B schematically illustrates gate usage profiles for three different instructions when those instructions are executed by a processor simulation in accordance with some examples.

FIG. 1B schematically illustrates example gate usage profiles for three different instructions when those instructions are executed by a processor simulation in accordance with some examples, such as the process 10 shown in FIG. 1A. It will be appreciated that the gate usage signature for each instruction is ultimately a list of each gate in the processor and a corresponding indication of whether that gate is used or not when the instruction is executed. However, the illustrations of FIG. 1B set out the gate usages across a grid-like representation of the set of gates in the processor to present a sense of the physical distribution of the gates in the manufactured processor.

Figure 2:
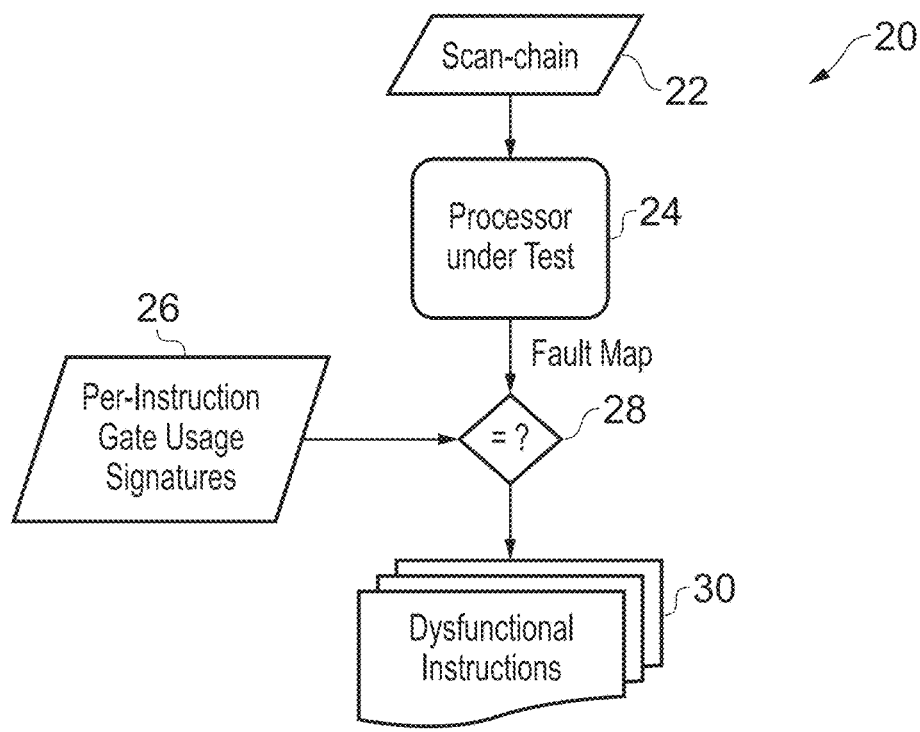
FIG. 2 illustrates a process by which a manufactured processor is tested and compared against per-instruction gate usage signatures in order to determine whether some instructions are to be categorised as dysfunctional in accordance with some examples.

FIG. 2 illustrates a process 20 by which a manufactured processor is tested and compared against per-instruction component (in this example, gate) usage signatures in order to determine whether some instructions are to be categorised as dysfunctional in accordance with some examples. A scan-chain methodology for exhaustively testing the manufactured processor is used here, according to which a scan chain 22 is applied to the processor under test 24, such that each of its gates are tested for correct functionality. As a result, a fault map is generated which indicates the location(s), i.e. gate(s), of any problems. Ideally if the manufacturing process has been flawless the fault map will be empty. However, when faults are identified in particular gates, these are then compared against a set of per instruction gate usage signatures 26 (such as the signatures 18 which were generated as a result of the process 10 of FIG. 1A. The instructions which make use of those gates identified as faulty are thus determined, and these are then categorised as a set of one or more dysfunctional instructions 30 for the manufactured processor.

Figure 3:
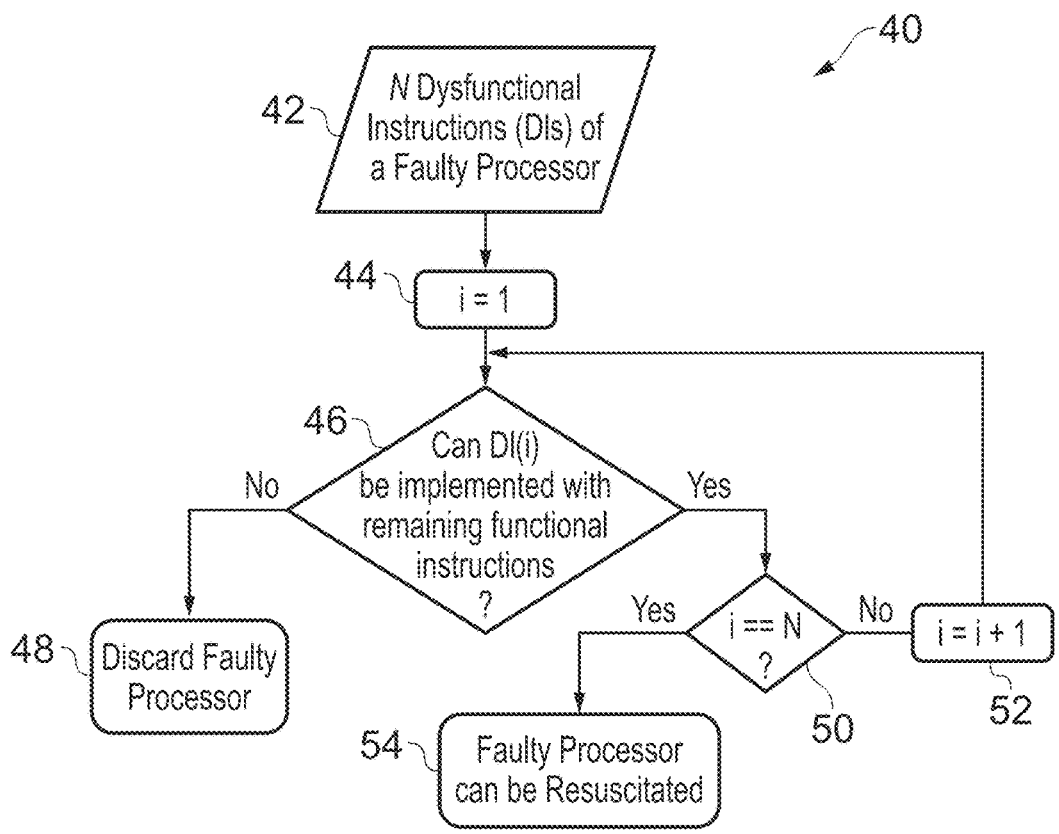
FIG. 3 illustrates process according to which each of the dysfunctional instructions determined for a processor are examined to determine if they can be implemented using the remaining functional instructions and hence whether the processor can be used or should be discarded in accordance with some examples.

FIG. 3 illustrates process 40 according to which each of the dysfunctional instructions determined for a processor are examined to determine if they can be implemented using the remaining functional instructions and hence whether the processor can be used or should be discarded in accordance with some examples. Set of N dysfunctional instructions for a given processor ("faulty processor") forms the input 42 to the process. At a subsequent initialisation step 44 a counter variable i is set to 1. Amongst the set of N dysfunctional instructions, it is then determined at step 46 whether the $i^{th}$ dysfunctional instruction can be implemented with the remaining functional instructions available to the processor. As noted above, it is known that certain instructions such as SUBLEQ and SUBNEG are Turing complete instructions in that they can use to implement all other arithmetic instructions. SUBLEQ itself may be implemented by a number of operations, depending on the instruction set architecture. For example, in the Arm architecture, SUBLEQ can be broken down into five operations: LD, ST, SUB, CMP, and BR. Of these, CMP can be performed with SUB and BR can be performed by SUB PC, 0. In theory any arithmetic instructions can be implemented with the three instructions LD, ST, and SUB. It is noted that this requires that the load/store (LD/ST) unit and the adder in the ALU a fully functional. Generally, for each instruction of the ISA, a set of other instructions which may be used to substitute for that instruction can be defined, and when the list of dysfunctional instructions and the list of functional instructions for a processor is known, it can be determined by examination of these lists whether a given dysfunctional instruction can be implemented with the remaining functional instructions. If it cannot and the flow of process 40 ends at step 48 and the faulty processor will be discarded. However, if at step 46 as it is determined that the dysfunctional instruction can be implemented with the remaining functional instructions available to the processor then the flow proceeds to step 50 where it is checked whether the counter i has reached N. If it has not, then i is incremented at step 52 and the flow returns to step 46 for the next dysfunctional instruction to be considered. Once i reaches N, the flow of process 40 concludes at step 48, and it has been determined that this faulty processor can be resuscitated, i.e. each of its dysfunctional instructions can be implemented with its remaining functional instructions.

Figure 4:
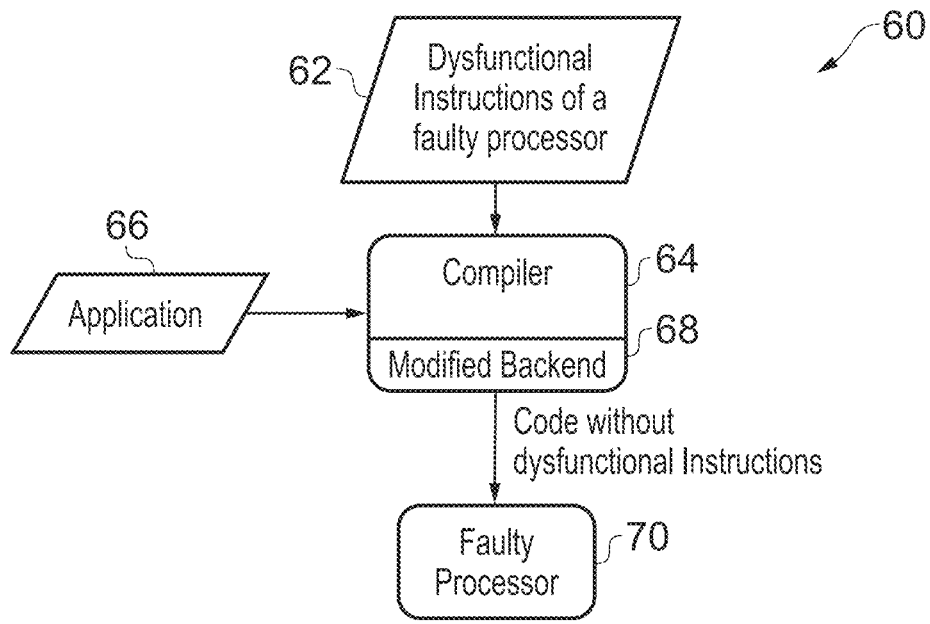
FIG. 4 illustrates a process according to which a compiler can modify the program instructions prepared for execution on a processor with reference to the known dysfunctional instructions of that processor to generate modified program instructions which the processor can execute in accordance with some examples.

FIG. 4 illustrates a process 60 according to which a compiler can modify the program instructions prepared for execution on a processor with reference to the known dysfunctional instructions of that processor to generate modified program instructions which the processor can execute in accordance with some examples. A processor which has been found to have one or more dysfunctional instructions in post-manufacturing testing can be shipped with a list of its dysfunctional instructions. This list of dysfunctional instructions 62 then provides one input to the instruction selection in generation of a compiler backend such that, when the compiler 64 is also provided with application software 66 intended to be executed on the processor, the (modified) compiler backend 68 will avoid using the dysfunctional instructions during code generation when it compiles the application software. If the compiler determines that this is not possible then the faulty processor must be discarded. Otherwise the compiled code generated without the use of the known dysfunctional instructions is provided to the faulty processor 70 for execution. This approach to the modified operation of the faulty processor has the advantage that no additional hardware is needed to support this technique. On the other hand, it does require each processor to be shipped with a list of its dysfunctional instructions and some compiler backend modification is required (i.e. that part of the compiler which identifies dysfunctional instructions and substitutes them with other instruction combinations).

Figure 5:
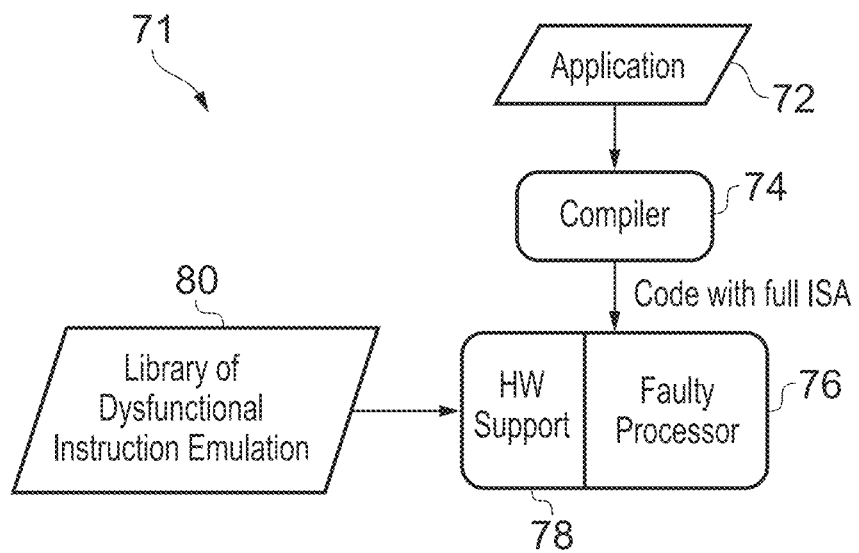
FIG. 5 illustrates a process according to which a processor which has dysfunctional instructions can nonetheless execute program instructions using the full instruction set architecture by the provision of a library of dysfunctional instruction emulation in accordance with some examples.

FIG. 5 illustrates a process 71 according to which a processor which has dysfunctional instructions can nonetheless execute program instructions using the full instruction set architecture by the provision of a library of dysfunctional instruction emulation in accordance with some examples. In this example the application software 72 is compiled in a normal manner by a compiler 74, and hence the executable code prepared for the processor comprises the full instruction set architecture. In order to be able to execute this code, the faulty processor 76 (which has one or more dysfunctional instructions) is modified to provide hardware support 78. The configuration and operation of this hardware support 78 will be described in more detail with reference to the figures which follow. Nevertheless, as shown in FIG. 5 a library of dysfunctional instruction emulation routines 80 provides a further input to the hardware support 78.

Figure 6:
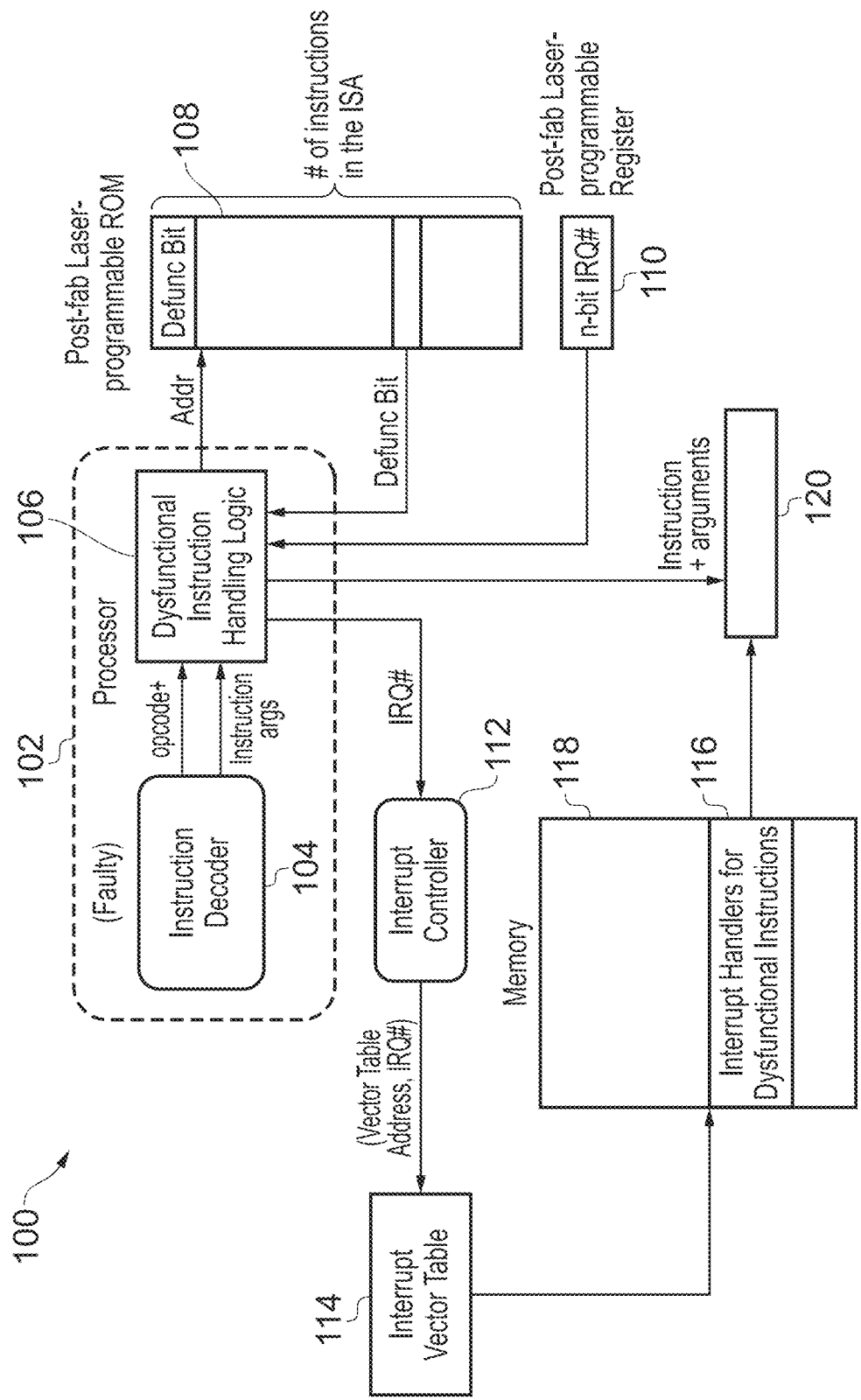
FIG. 6 schematically illustrates some components of a processor which has dysfunctional instructions, which allow those dysfunctional instructions to be identified and their execution to be emulated by means of respective interrupt handling routines in accordance with some examples.

FIG. 6 schematically illustrates some components of a processor 100 which has dysfunctional instructions, which allow those dysfunctional instructions to be identified and their execution to be emulated by means of respective interrupt handling routines in accordance with some examples. In this illustrated example the faulty processor is a single-issue, in-order processor, manufactured using printed/flexible integrated circuit technology. The instruction execution pipeline 102 of the processor 100 comprises instruction decoder 104 and dysfunctional instruction handling logic 106. As the sequence of instructions to be executed by the processor 100 are decoded by the instruction decoder 104, any instances of dysfunctional instructions in that sequence are identified with the assistance of the dysfunctional instruction handling logic 106. In particular, the opcodes of the instructions decoded by the instruction decoder 104 are passed to the dysfunctional instruction handling logic 106 to facilitate this identification. On the basis of an opcode indicated, the dysfunctional instruction handling logic 106 performs a lookup in the ROM 108. The ROM 108 is a post-manufacture (fabrication) laser-programmable device and following the post-manufacture functionality testing which the processor underwent, which established its one or more dysfunctional instructions, a step of laser-writing to the ROM 108 was carried out to indicate that set of dysfunctional instructions. This laser writing involves the targeted destruction of a particular connection in the ROM entries in order to record one bit of information. Essentially the ROM 108 stores a single bit corresponding to each of the instructions in the ISA, where a predetermined bit value indicates whether or not that instruction is dysfunctional. In addition, there is provided a post-manufacture laser programmable register 110 into which a value was also laser written after the post-manufacture functionality testing. This value indicates an n-bit IRQ number, i.e. a particular interrupt number which can be used to invoke interrupt handlers for the dysfunctional instructions, where this number was defined as part of the result of the post-manufacture functionality testing. Accordingly, when an instance of a dysfunctional instruction is encountered in the sequence of instructions being executed by the processor, this is identified by the dysfunctional instruction handling logic 106 and it uses the n-bit IRQ #retrieved from the programmable register 110 to signal this interrupt to an interrupt controller 112. The interrupt controller 112 refers to an interrupt vector table 114 using the received IRQ #, and the interrupt vector table 114 indicates the location 116 in memory 118 where the interrupt handler(s) for the dysfunctional instruction(s) can be found. A corresponding interrupt handler (interrupt handling routine) is then executed in order to emulate the dysfunctional instruction encountered. This interrupt handler makes reference to a further register 120 which is used to store information about the dysfunctional instruction and its arguments. This provides the interrupt handler with all the information it needs in order to fully emulate the dysfunctional instruction. As an alternative to the IRQ number stored in the register 110, one of the reserved IRQ #s in the processor can be used for this purpose and the register 110 need not be provided in such case. This approach to the modified operation of the faulty processor has the advantage that the application software (binary) executed by the processor has not required adaptation, meaning that it can be executed not only on this processor but on any other processor (of the same type) whether faulty or not. On the other hand, a faulty processor is shipped with an interrupt handler forming part of the firmware (and requiring additional storage). The storage used for the identification of dysfunctional instructions 108 and the instruction and arguments register 120 also adds to the area of the device.

Figure 7:
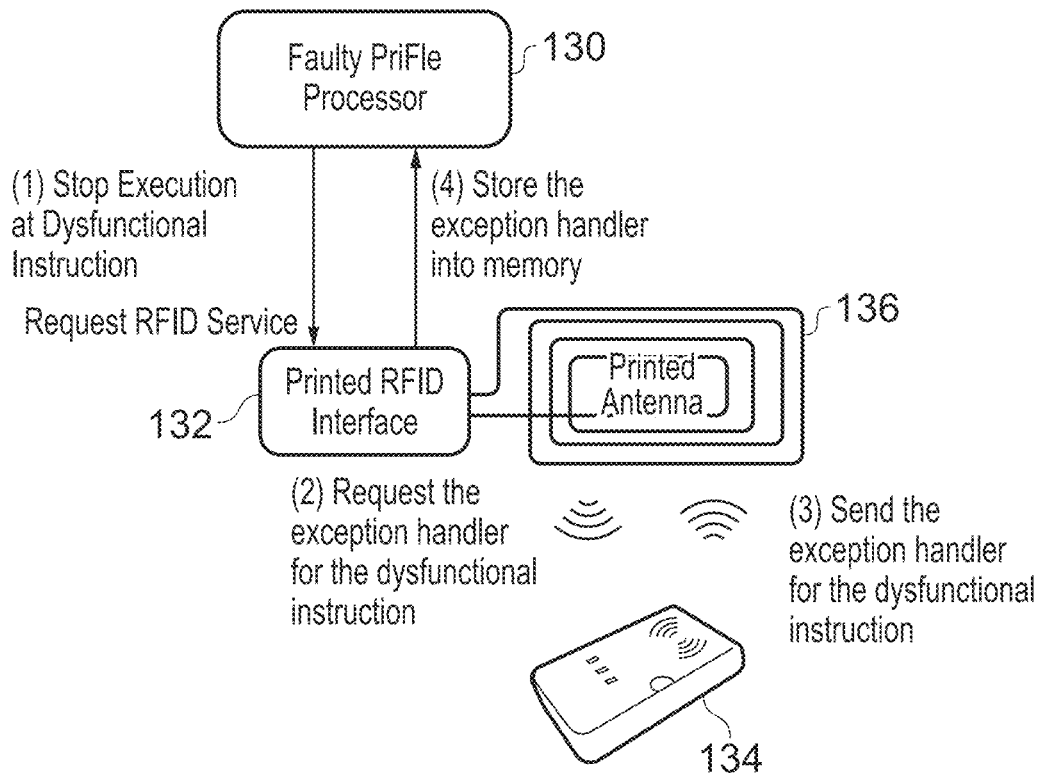
FIG. 7 schematically illustrates a processor which has dysfunctional instructions and comprises an RFID interface via which it can communicate with a further device from which it can request an exception handler for each dysfunctional instruction as each dysfunctional instruction is encountered in accordance with some examples.

FIG. 7 schematically illustrates a processor 130 which has dysfunctional instructions and comprises an RFID interface 132 via which it can communicate with a further device 134 from which it can request an exception handler for each dysfunctional instruction as each dysfunctional instruction is encountered in accordance with some examples. In this example the faulty processor is manufactured using printed/flexible integrated circuit technology. The communication interface 132 in this example is based on RFID technology and thus further comprises a printed antenna 136. Generally, the RFID interface is provided to allow the processor 130 to communicate with a further device 134. To give just one example context for this arrangement, the printed/flexible (PriFle) processor 130 may provide the data processing capability for a printed smart label which is applied to an item which is present in a warehouse. The device 134 is used within the warehouse in order to interact with the smart labels on the items in the warehouse for stock control and monitoring purposes. Thus for the majority of time the printed smart label is inactive, but one instance when it is active is when the device 134 is brought into proximity with the smart label, activating the processor 130 via communication using the RFID interface 132. When the processor 130 is activated, it performs certain data processing operations, where these operations are defined by a sequence of instructions which it executes. Amongst these there may be one or more instances of the one or more dysfunctional instructions identified for this (faulty) processor. When a dysfunctional instruction is encountered, instruction execution is halted and interaction via the RFID interface 132 begins. A request for an exception (interrupt) handler for the dysfunctional instruction is then sent to the further device 134 via the RFID interface/antenna 132/136. In response the further device 134 sends the required exception handler for the dysfunctional instruction back via the RFID interface/antenna 132/134. This exception handler is then stored in the memory of the processor 130 and is executed in order to emulate the dysfunctional instruction. Normal instruction execution of the sequence instructions can then be resumed.

Figure 8:
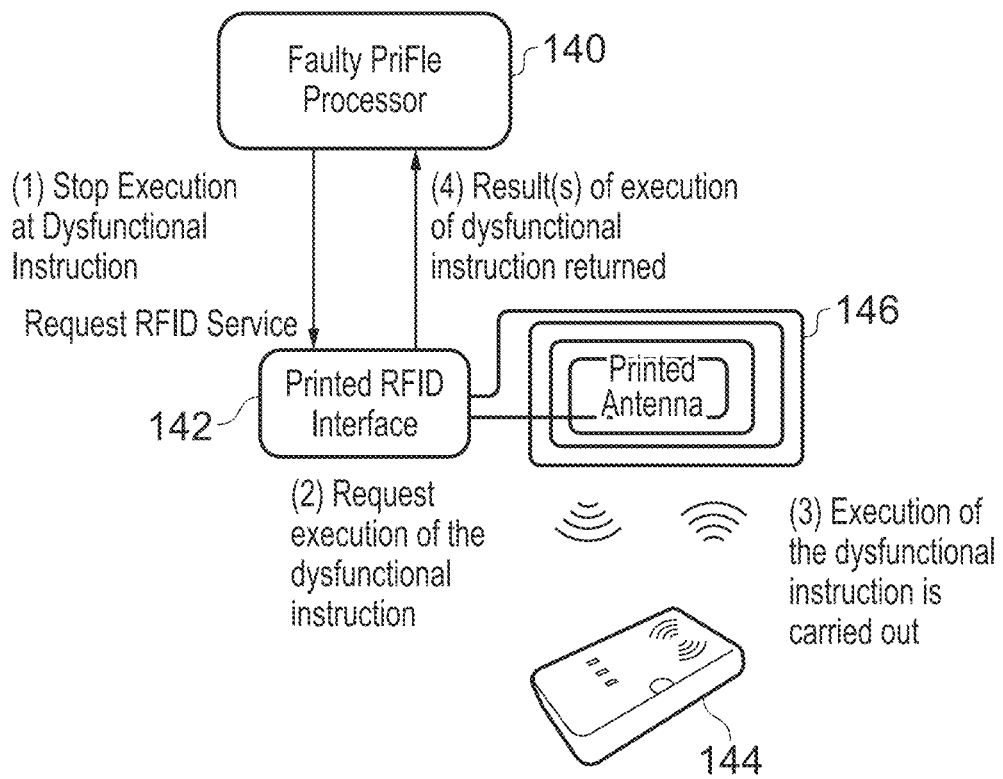
FIG. 8 schematically illustrates a processor which has dysfunctional instructions and comprises an RFID interface via which it can communicate with a further device which can execute each dysfunctional instruction on behalf of the processor as each dysfunctional instruction is encountered in accordance with some examples.

FIG. 8 schematically illustrates a processor 140 which has dysfunctional instructions and comprises an RFID interface 142 via which it can communicate with a further device 144 which can execute each dysfunctional instruction on behalf of the processor as each dysfunctional instruction is encountered in accordance with some examples. Accordingly, the example illustrated in FIG. 8 is a variant on that illustrated in FIG. 7, and the same example context/configuration may apply. In this example, when the processor 140 is active it performs certain data processing operations, where these operations are defined by a sequence of instructions which it executes. Amongst these there may be one or more instances of the one or more dysfunctional instructions identified for this (faulty) processor. When a dysfunctional instruction is encountered, instruction execution is halted and interaction via the RFID interface 142 begins. A request for execution of the dysfunctional instruction is then sent to the further device 144 via the RFID interface/antenna 142/146. The request therefore not only indicates that if dysfunctional instruction, but also any arguments (operands) associated with. In response the further device 144 executes the dysfunctional instruction on behalf the processor 140 and sends the results back via the RFID interface/antenna 142/146. These results are then integrated into the processor state of the processor 140 and normal instruction execution of the sequence instructions (subsequent to the dysfunctional instruction) can then be resumed.

Figure 9:
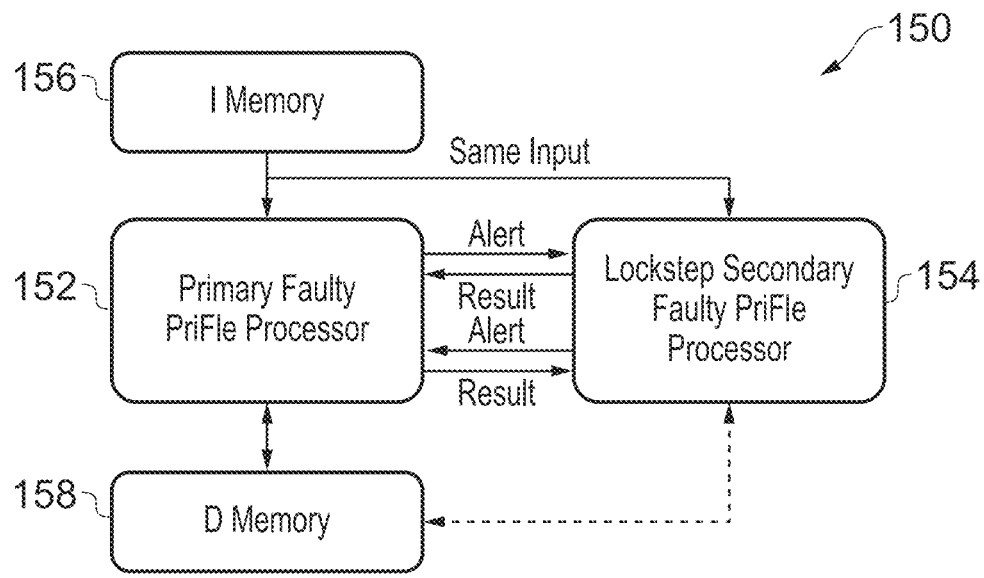
FIG. 9 schematically illustrates a data processing system comprising two processors which have dysfunctional instructions and are arranged to operate in lockstep with one another, such that the processing results of a dysfunctional instruction in one processor can be provided by the other processor, in accordance with some examples.

FIG. 9 schematically illustrates a data processing system 150 comprising two processors 152, 154 which have dysfunctional instructions and are arranged to operate in lockstep with one another, such that the processing results of a dysfunctional instruction in one processor can be provided by the other processor, in accordance with some examples. It will be appreciated therefore that in such an example it is required for the two faulty processors to complement each other, i.e. that the intersection of their dysfunctional instruction sets must be empty. Operation of the two processors in lockstep with one another thus means that the same instruction sequence (retrieved from instruction memory 156) is provided to both processors, which then execute the instruction sequence in parallel with one another, maintaining the same register state. When one of the processors detects one of its dysfunctional instructions, it pauses instruction execution and alerts the other processor that it cannot execute that instruction. The other processor then normally executes that instruction and provides the alerting processor with the execution results. The two processors 152, 154 thus complement each other, each being able to alert the other and receive instruction execution results in this manner. It is to be noted that this technique need not be restricted to only two complementary processors, and more than two processors may be coupled together in this manner to provide complementary instruction execution. The results of the data processing carried out by the data processing system 150 are stored in the data memory 158, where as shown in FIG. 9, one of the processors (in this case primary processor 152) is statically assigned to be the primary processor which is allowed to update the memory. Secondary processor 154 can nonetheless read data stored in the memory 158 in parallel with primary processor 152.

Figure 10:
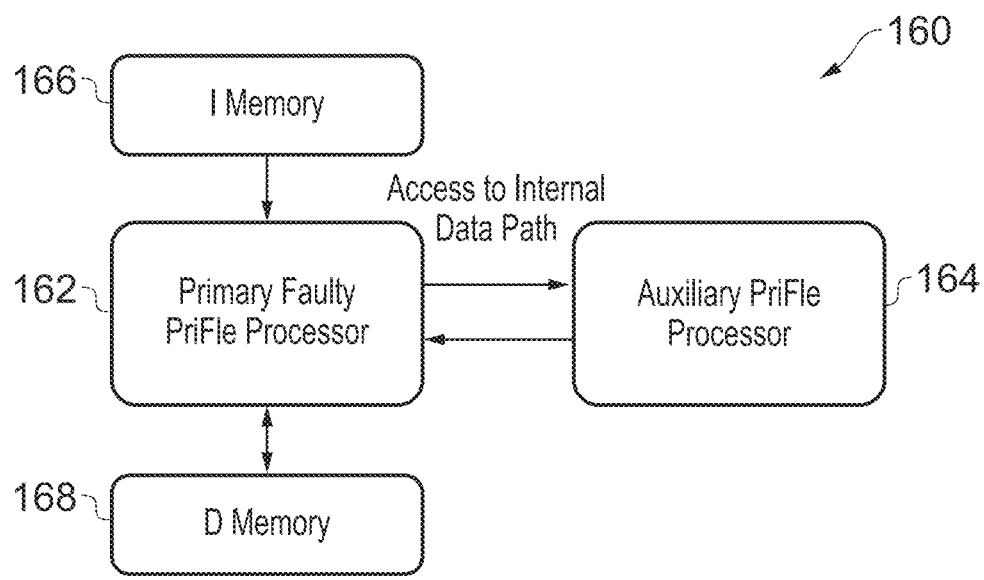
FIG. 10 schematically illustrates a data processing system comprising one processor which has dysfunctional instructions and an auxiliary processor, wherein the auxiliary processor is arranged to perform data processing operations to substitute for the execution of a dysfunctional instruction in the first processor in accordance with some examples.

FIG. 10 schematically illustrates a data processing system 160 comprising one processor 162 which has dysfunctional instructions and an auxiliary processor 164, wherein the auxiliary processor is arranged to perform data processing operations to substitute for the execution of a dysfunctional instruction in the first processor in accordance with some examples. Thus in this example the auxiliary processor 164 may also be faulty (like the primary processor 162) or may not. Again like in the example of FIG. 9, it is clearly necessary for the two faulty processors to complement each other, i.e. that the intersection of their dysfunctional instruction sets must be empty. However, in this example the instruction execution capability of the two processors may be significantly asymmetric, in that the auxiliary processor is only required to provide the instruction execution capability for the one or more dysfunctional instructions of the primary processor. By comparison with some of the examples given above in which instruction emulation of a dysfunctional instruction is provided by an interrupt handling routine mechanism, the approach shown in FIG. 10 may be preferable in examples where the exception handlers require too much instruction storage or deemed to be too slow, or indeed because a critical instruction (such as the above-mentioned SUBLEQ instruction) itself requires emulation. In operation of the data processing system 160, the instruction sequence retrieved from the instruction memory 166 is provided only to the primary processor 162, which executes the sequence of instructions. When the primary processor 162 detects one of its dysfunctional instructions, it pauses instruction execution and alerts the auxiliary processor that it cannot execute that instruction. Furthermore, the primary processor provides auxiliary processor with sufficient processor state, such that the auxiliary processor can execute the dysfunctional instruction on behalf of the primary processor. The auxiliary processor then executes that instruction and provides the primary processor with the execution results. It is to be noted therefore that the auxiliary processor 164 need not be provided as a fully-fledged processor in the manner of the primary processor 162 (with a full pipelined arrangement of instruction fetch/decode/issue/execution) and might only be provided as a specific functional unit required to support the execution of the dysfunctional instruction. In essence the auxiliary processor provides that physical part of the primary processor which is dysfunctional.

In brief overall summary methods of performing post-manufacturing adaptation of a data processing apparatus manufactured in accordance with a processor design and corresponding data processing apparatus configurations are provided. Post-manufacturing testing of the data processing apparatus determines any dysfunctional instructions by comparison between component usage profiles for each instruction and a component fault-detection procedure applied to the data processing apparatus. The data processing apparatus can be determined nevertheless to be operationally viable when any dysfunctional instructions can be substituted for by emulation using other functional instructions. The data processing apparatus can be provided with dysfunctional instruction handling circuitry configured to identify occurrence of a program instruction instance of a dysfunctional instruction and to invoke an interrupt handling routine associated with the dysfunctional instruction to emulate the instance of a dysfunctional instruction.

Various example configurations are set out in the following numbered clauses:

Clause 1.

A method of performing post-manufacturing adaptation of a data processing apparatus manufactured in accordance with a processor design, wherein the processor design corresponds to an instruction set architecture, comprising:
  generating a component usage profile of a processor simulation in accordance with the processor design for each instruction of the instruction set architecture;
  performing a fault-detection procedure on the data processing apparatus to determine one or more component faults;
  determining one or more dysfunctional instructions of the instruction set architecture as applied to the data processing apparatus by mapping the one or more component faults determined onto the component usage profile;
  determining whether the data processing apparatus is operationally viable in that the one or more dysfunctional instructions can be substituted for by usage of one or more instructions which are not found to be dysfunctional instructions for the data processing apparatus;
  signalling that the data processing apparatus requires modified operation when it is determined to be operationally viable.

Clause 2.

The method as claimed in clause 1, further comprising:
  when the data processing apparatus requires modified operation, generating one or more interrupt handling routines corresponding to the one or more dysfunctional instructions, wherein the one or more interrupt handling routines comprise substitutions for the one or more dysfunctional instructions using the one or more instructions which are not found to be dysfunctional instructions for the data processing apparatus; and storing the one or more interrupt handling routines in association with the data processing apparatus.

Clause 3.

The method as claimed in clause 1 or clause 2, further comprising:

when the data processing apparatus requires modified operation, causing post-manufacturing programmable storage in the data processing apparatus to store one or more indications corresponding to the one or more dysfunctional instructions.

Clause 4.

The method as claimed in clause 3, wherein the post-manufacturing programmable storage is a laser-programmable read-only-memory.

Clause 5.

The method as claimed in clause 2, or any of clauses 3-4 when dependent on clause 2, further comprising causing a post-manufacturing programmable register to store a value indicative of a storage location of the interrupt handling routine.

Clause 6.

The method as claimed in clause 5, wherein the value indicative of the storage location of the interrupt handling routine is a unique interrupt identifier.

Clause 7.

The method as claimed in any of clauses 1-6, further comprising: providing a compiler with an indication of the one or more dysfunctional instructions;

providing the compiler with a sequence of program instructions intended for execution by the data processing apparatus to perform data processing operations;

operating the compiler to identify occurrence of a program instruction instance of a dysfunctional instruction of the one or more dysfunctional instructions in the sequence of program instructions; and operating the compiler to generate modified executable code for the data processing apparatus by substituting for the program instruction instance of the dysfunctional instruction using the one or more instructions which are not found to be dysfunctional instructions for the data processing apparatus.

Clause 8.

The method as claimed in any of clauses 1-7, further comprising:

signalling that the data processing apparatus is to be discarded when it is determined not to be operationally viable Clause 9.

A data processing apparatus, wherein the data processing apparatus has been manufactured in accordance with a processor design corresponding to an instruction set architecture, and wherein one or more dysfunctional instructions of the instruction set architecture as applied to the data processing apparatus have been identified, the data processing apparatus comprising:

instruction execution circuitry to perform data processing operations by execution of a sequence of program instructions;

dysfunctional instruction handling circuitry configured to identify occurrence of a program instruction instance of a dysfunctional instruction of the one or more dysfunctional instructions in the sequence of program instructions and to invoke an interrupt handling routine associated with the dysfunctional instruction, wherein the interrupt handling routine substitutes for execution of the instance of a dysfunctional instruction.

Clause 10.

The data processing apparatus as claimed in clause 9, further comprising:

interrupt handling circuitry configured to perform the interrupt handling routine in response to a signal from the dysfunctional instruction handling circuitry.

Clause 11.

The data processing apparatus as claimed in clause 9 or clause 10, further comprising:

post-manufacturing programmable storage storing one or more indications corresponding to the one or more dysfunctional instructions, wherein the dysfunctional instruction handling circuitry is configured to identify the occurrence of the program instruction instance of the dysfunctional instruction with reference to indications stored in the post-manufacturing programmable storage.

Clause 12.

The data processing apparatus as claimed in clause 11, wherein the post-manufacturing programmable storage is a laser-programmable read-only-memory.

Clause 13.

The data processing apparatus as claimed in any of clauses 9-12, further comprising a post-manufacturing programmable register storing a value indicative of a storage location of the interrupt handling routine.

Clause 14.

The data processing apparatus as claimed in clause 13, wherein the value indicative of the storage location of the interrupt handling routine is a unique interrupt identifier, wherein the dysfunctional instruction handling circuitry is configured to signal the occurrence to the interrupt handling circuitry using the unique interrupt identifier.

Clause 15.

The data processing apparatus as claimed in any of clauses 9-12, wherein the dysfunctional instruction handling circuitry is configured to signal the occurrence to the interrupt handling circuitry using a predetermined interrupt identifier to an interrupt controller.

Clause 16.

The data processing apparatus as claimed in any of clauses 9-12, further comprising:

a communication interface configured to provide communication with a further data processing apparatus; and local storage, wherein the dysfunctional instruction handling circuitry is configured to invoking the interrupt handling routine associated with the dysfunctional instruction by causing the data processing apparatus to:

pause the execution of the sequence of program instructions;

transmit via the communication interface to the further data processing apparatus an indication of the program instruction instance of the dysfunctional instruction;

receive via the communication interface the interrupt handling routine from the further data processing apparatus and storing the interrupt handling routine in the local storage;

execute the interrupt handling routine from the local storage; and resume the execution of the sequence of program instructions after the program instruction instance of the dysfunctional instruction.

Clause 17.

The data processing apparatus as claimed in any of clauses 9-12, further comprising:
- a communication interface configured to provide communication with a further data processing apparatus,
- wherein the dysfunctional instruction handling circuitry is configured to invoking the interrupt handling routine associated with the dysfunctional instruction by causing the data processing apparatus to:
- pause the execution of the sequence of program instructions;
- transmit via the communication interface to the further data processing apparatus an indication of the program instruction instance of a dysfunctional instruction;
- receive via the communication interface from the further data processing apparatus results of execution of the program instruction instance of the dysfunctional instruction; and
- resume the execution of the sequence of program instructions after the program instruction instance of the dysfunctional instruction.

Clause 18.

The data processing apparatus as claimed in clause 16 or clause 17, wherein the communication interface supports wireless communication.

Clause 19.

The data processing apparatus as claimed in clause 18, wherein the communication interface is an RFID interface.

Clause 20.
- A data processing system comprising:
- a first data processing apparatus as claimed in clause 9;
- a second data processing apparatus as claimed in clause 9,
- wherein a first set of one or more dysfunctional instructions of the first data processing apparatus and a second set of one or more dysfunctional instructions of the second data processing apparatus do not intersect; and
- communication circuitry configured to support communication between the first data processing apparatus and the second data processing apparatus,
- wherein the first data processing apparatus and the second data processing are configured to operate in lock-step with each other to perform data processing operations by execution of a sequence of program instructions,
- and wherein the first data processing apparatus is responsive to identifying occurrence of a program instruction instance of a dysfunctional instruction of the first set of one or more dysfunctional instructions in the sequence of program instructions to:
- pause the execution of the sequence of program instructions in the first data processing apparatus; and
- communicate via the communication circuitry to the second data processing apparatus an indication of the program instruction instance of the dysfunctional instruction,
- wherein the second data processing apparatus is responsive to the indication of the program instruction instance of the dysfunctional instruction to return via the communication circuitry results of execution of the program instruction instance of the dysfunctional instruction,
- and wherein the first data processing apparatus is responsive to reception of the results of execution to resume the execution of the sequence of program instructions in the first data processing apparatus after the program instruction instance of the dysfunctional instruction.

Clause 21.

The data processing system as claimed in clause 20, wherein only one of the first data processing and the second data processing apparatus is permitted to perform updates with respect to a memory to which both the first data processing apparatus and the second data processing apparatus have access.

Clause 22.
- A data processing system comprising:
- a first data processing apparatus as claimed in clause 9;
- a second data processing apparatus,
- wherein a first set of one or more dysfunctional instructions of the first data processing apparatus and a second set of zero or more dysfunctional instructions of the second data processing apparatus do not intersect; and
- communication circuitry configured to support communication between the first data processing apparatus and the second data processing apparatus,
- wherein the first data processing apparatus is responsive to identifying occurrence of a program instruction instance of a dysfunctional instruction of the first set of one or more dysfunctional instructions in the sequence of program instructions to:
- pause the execution of the sequence of program instructions in the first data processing apparatus; and
- communicate via the communication circuitry to the second data processing apparatus an indication of the program instruction instance of the dysfunctional instruction and any operands associated with the program instruction instance,
- wherein the second data processing apparatus is responsive to the program instruction instance of the dysfunctional instruction to return via the communication circuitry results of execution of the program instruction instance of the dysfunctional instruction,
- and wherein the first data processing apparatus is responsive to reception of the results of execution to resume the execution of the sequence of program instructions in the first data processing apparatus after the program instruction instance of the dysfunctional instruction.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

We claim:

1. A method of performing post-manufacturing adaptation of a data processing apparatus manufactured in accordance with a processor design, wherein the processor design corresponds to an instruction set architecture, comprising:

generating a component usage profile of a processor simulation in accordance with the processor design for each instruction of the instruction set architecture;

performing a fault-detection procedure on the data processing apparatus to determine one or more component faults;

determining one or more dysfunctional instructions of the instruction set architecture as applied to the data processing apparatus by mapping the one or more component faults determined onto the component usage profile;

determining whether the data processing apparatus is operationally viable in that the one or more dysfunctional instructions can be substituted for by usage of one or more instructions which are not found to be dysfunctional instructions for the data processing apparatus; and signalling that the data processing apparatus requires modified operation when it is determined to be operationally viable.

2. The method as claimed in claim 1, further comprising:
when the data processing apparatus requires modified operation, generating one or more interrupt handling routines corresponding to the one or more dysfunctional instructions, wherein the one or more interrupt handling routines comprise substitutions for the one or more dysfunctional instructions using the one or more instructions which are not found to be dysfunctional instructions for the data processing apparatus; and
storing the one or more interrupt handling routines in association with the data processing apparatus.

3. The method as claimed in claim 1, further comprising:
when the data processing apparatus requires modified operation, causing post-manufacturing programmable storage in the data processing apparatus to store one or more indications corresponding to the one or more dysfunctional instructions.

4. The method as claimed in claim 3, wherein the post-manufacturing programmable storage is a laser-programmable read-only-memory.

5. The method as claimed in claim 2, further comprising causing a post-manufacturing programmable register to store a value indicative of a storage location of the interrupt handling routine.

6. The method as claimed in claim 5, wherein the value indicative of the storage location of the interrupt handling routine is a unique interrupt identifier.

7. The method as claimed in claim 1, further comprising:
providing a compiler with an indication of the one or more dysfunctional instructions;
providing the compiler with a sequence of program instructions intended for execution by the data processing apparatus to perform data processing operations;
operating the compiler to identify occurrence of a program instruction instance of a dysfunctional instruction of the one or more dysfunctional instructions in the sequence of program instructions; and
operating the compiler to generate modified executable code for the data processing apparatus by substituting for the program instruction instance of the dysfunctional instruction using the one or more instructions which are not found to be dysfunctional instructions for the data processing apparatus.

8. A system comprising a post-manufacturing adaptation apparatus configured to perform post-manufacturing adaptation of a data processing apparatus manufactured in accordance with a processor design, wherein the processor design corresponds to an instruction set architecture, the post-manufacturing adaptation comprising:

generating a component usage profile of a processor simulation in accordance with the processor design for each instruction of the instruction set architecture;

performing a fault-detection procedure on the data processing apparatus to determine one or more component faults;

determining one or more dysfunctional instructions of the instruction set architecture as applied to the data processing apparatus by mapping the one or more component faults determined onto the component usage profile;

determining whether the data processing apparatus is operationally viable in that the one or more dysfunctional instructions can be substituted for by usage of one or more instructions which are not found to be dysfunctional instructions for the data processing apparatus; and signaling that the data processing apparatus requires modified operation when it is determined to be operationally viable; and the system further comprising the data processing apparatus, the data processing apparatus comprising:
instruction execution circuitry to perform data processing operations by execution of a sequence of program instructions;
dysfunctional instruction handling circuitry configured to identify occurrence of a program instruction instance of a dysfunctional instruction of the one or more dysfunctional instructions in the sequence of program instructions and to invoke an interrupt handling routine associated with the dysfunctional instruction, wherein the interrupt handling routine substitutes for execution of the instance of a dysfunctional instruction.

9. The system as claimed in claim 8, the data processing apparatus further comprising:
interrupt handling circuitry configured to perform the interrupt handling routine in response to a signal from the dysfunctional instruction handling circuitry.

10. The system as claimed in claim 8, the data processing apparatus further comprising:
post-manufacturing programmable storage storing one or more indications corresponding to the one or more dysfunctional instructions,
wherein the dysfunctional instruction handling circuitry is configured to identify the occurrence of the program instruction instance of the dysfunctional instruction with reference to indications stored in the post-manufacturing programmable storage.

11. The system as claimed in claim 10, wherein the post-manufacturing programmable storage is a laser-programmable read-only-memory.

12. The system as claimed in claim 8, the data processing apparatus further comprising a post-manufacturing programmable register storing a value indicative of a storage location of the interrupt handling routine.

13. The system as claimed in claim 12, wherein the value indicative of the storage location of the interrupt handling routine is a unique interrupt identifier,
wherein the dysfunctional instruction handling circuitry is configured to signal the occurrence to the interrupt handling circuitry using the unique interrupt identifier.

14. The system as claimed in claim 8, wherein the dysfunctional instruction handling circuitry is configured to signal the occurrence to the interrupt handling circuitry using a predetermined interrupt identifier to an interrupt controller.

15. The system as claimed in claim 8, the data processing apparatus further comprising:
a communication interface configured to provide communication with a further data processing apparatus; and local storage,
wherein the dysfunctional instruction handling circuitry is configured to invoking the interrupt handling routine associated with the dysfunctional instruction by causing the data processing apparatus to:
pause the execution of the sequence of program instructions;
transmit via the communication interface to the further data processing apparatus an indication of the program instruction instance of the dysfunctional instruction;
receive via the communication interface the interrupt handling routine from the further data processing apparatus and storing the interrupt handling routine in the local storage;
execute the interrupt handling routine from the local storage; and
resume the execution of the sequence of program instructions after the program instruction instance of the dysfunctional instruction.

16. The system as claimed in claim 8, the data processing apparatus further comprising:
a communication interface configured to provide communication with a further data processing apparatus,
wherein the dysfunctional instruction handling circuitry is configured to invoking the interrupt handling routine associated with the dysfunctional instruction by causing the data processing apparatus to:
pause the execution of the sequence of program instructions;
transmit via the communication interface to the further data processing apparatus an indication of the program instruction instance of a dysfunctional instruction;
receive via the communication interface from the further data processing apparatus results of execution of the program instruction instance of the dysfunctional instruction; and
resume the execution of the sequence of program instructions after the program instruction instance of the dysfunctional instruction.

17. The system as claimed in claim 15, wherein the communication interface supports wireless communication.

18. The system as claimed in claim 17, wherein the communication interface is an RFID interface.

19. A data processing system comprising:
a first data processing apparatus, wherein the first data processing apparatus has been manufactured in accordance with a processor design corresponding to an instruction set architecture, and wherein a first set of one or more dysfunctional instructions of the instruction set architecture as applied to the first data processing apparatus have been identified, the first data processing apparatus comprising:
first instruction execution circuitry to perform data processing operations by execution of a sequence of program instructions;
first dysfunctional instruction handling circuitry configured to identify occurrence of a program instruction instance of a dysfunctional instruction of the first set of one or more dysfunctional instructions in the sequence of program instructions and to invoke an interrupt handling routine associated with the dysfunctional instruction, wherein the interrupt handling routine substitutes for execution of the instance of a dysfunctional instruction;
a second data processing apparatus, wherein the second data processing apparatus has been manufactured in accordance with the processor design corresponding to the instruction set architecture, and wherein a second set of one or more dysfunctional instructions of the instruction set architecture as applied to the second data processing apparatus have been identified, the second data processing apparatus comprising:
second instruction execution circuitry to perform data processing operations by execution of the sequence of program instructions;
second dysfunctional instruction handling circuitry configured to identify occurrence of a program instruction instance of a dysfunctional instruction of the second set of one or more dysfunctional instructions in the sequence of program instructions and to invoke an interrupt handling routine associated with the dysfunctional instruction, wherein the interrupt handling routine substitutes for execution of the instance of a dysfunctional instruction,
wherein the first set of one or more dysfunctional instructions of the first data processing apparatus and the second set of one or more dysfunctional instructions of the second data processing apparatus do not intersect; and
communication circuitry configured to support communication between the first data processing apparatus and the second data processing apparatus,
wherein the first data processing apparatus and the second data processing are configured to operate in lock-step with each other to perform data processing operations by execution of a sequence of program instructions,
and wherein the first data processing apparatus is responsive to identifying occurrence of a program instruction instance of a dysfunctional instruction of the first set of one or more dysfunctional instructions in the sequence of program instructions to:
pause the execution of the sequence of program instructions in the first data processing apparatus; and
communicate via the communication circuitry to the second data processing apparatus an indication of the program instruction instance of the dysfunctional instruction,
wherein the second data processing apparatus is responsive to the indication of the program instruction instance of the dysfunctional instruction to return via the communication circuitry results of execution of the program instruction instance of the dysfunctional instruction,
and wherein the first data processing apparatus is responsive to reception of the results of execution to resume the execution of the sequence of program instructions in the first data processing apparatus after the program instruction instance of the dysfunctional instruction.

20. The data processing system as claimed in claim 19, wherein only one of the first data processing and the second data processing apparatus is permitted to perform updates with respect to a memory to which both the first data processing apparatus and the second data processing apparatus have access.

21. A data processing system comprising:
a first data processing apparatus, wherein the first data processing apparatus has been manufactured in accordance with a processor design corresponding to an instruction set architecture, and wherein a first set of one or more dysfunctional instructions of the instruction set architecture as applied to the first data processing apparatus have been identified, the first data processing apparatus comprising:
first instruction execution circuitry to perform data processing operations by execution of a sequence of program instructions;
first dysfunctional instruction handling circuitry configured to identify occurrence of a program instruction instance of a dysfunctional instruction of the first set of one or more dysfunctional instructions in the sequence of program instructions and to invoke an interrupt handling routine associated with the dysfunctional instruction, wherein the interrupt handling routine substitutes for execution of the instance of a dysfunctional instruction;
a second data processing apparatus,
wherein the first set of one or more dysfunctional instructions of the first data processing apparatus and a second set of zero or more dysfunctional instructions of the second data processing apparatus do not intersect; and
communication circuitry configured to support communication between the first data processing apparatus and the second data processing apparatus,
wherein the first data processing apparatus is responsive to identifying occurrence of a program instruction instance of a dysfunctional instruction of the first set of one or more dysfunctional instructions in the sequence of program instructions to:
pause the execution of the sequence of program instructions in the first data processing apparatus; and
communicate via the communication circuitry to the second data processing apparatus an indication of the program instruction instance of the dysfunctional instruction and any operands associated with the program instruction instance,
wherein the second data processing apparatus is responsive to the program instruction instance of the dysfunctional instruction to return via the communication circuitry results of execution of the program instruction instance of the dysfunctional instruction,
and wherein the first data processing apparatus is responsive to reception of the results of execution to resume the execution of the sequence of program instructions in the first data processing apparatus after the program instruction instance of the dysfunctional instruction.

* * * * *